United States Patent
Szilagyi et al.

(10) Patent No.: US 6,398,422 B1
(45) Date of Patent: Jun. 4, 2002

(54) DUAL-FUNCTION DUST COVER

(75) Inventors: B. Daniel Szilagyi, Naperville; Scot A. Ernst, Plainfield; Igor Grois, Northbrook, all of IL (US)

(73) Assignee: Molex Incorporated, Lisle, IL (US)

( * ) Notice: Subject to any disclaimer, the term of this patent is extended or adjusted under 35 U.S.C. 154(b) by 19 days.

(21) Appl. No.: 09/614,844

(22) Filed: Jul. 12, 2000

(51) Int. Cl.[7] .................................................. G02B 6/36

(52) U.S. Cl. .......................................... 385/76; 439/135

(58) Field of Search ............................. 385/76, 77, 58, 385/55, 53; 439/135

(56) References Cited

U.S. PATENT DOCUMENTS 4,684,161 A * 8/1987 Egner et al. .................. 385/78
5,440,235 A * 8/1995 Oko .......................... 439/135

* cited by examiner

Primary Examiner—Brian Sircus
Assistant Examiner—P Dinh
(74) Attorney, Agent, or Firm—A. A. Tirva

(57) ABSTRACT

A dual-function dust cover is provided for a fiber optic connector having a mating end. The dust includes a securing portion for facilitating securing the dust cover to the fiber optic connector to protecting at least a portion of the mating end thereof. The dust cover also includes a pulling portion for attachment thereto of a pulling device to facilitate pulling the connector through an appropriate structure.

10 Claims, 2 Drawing Sheets

DUAL-FUNCTION DUST COVER

FIELD OF THE INVENTION

This invention generally relates to the art of fiber optic connector assemblies and, particularly, to a dual-function dust cover which performs multiple functions of protecting a mating end of a fiber optic connector as well as providing a pulling eye for the connector.

BACKGROUND OF THE INVENTION

Fiber optic connectors of a wide variety of designs have been employed to terminate optical fiber cables and to facilitate connection of the cables to other cables or other optical fiber transmission devices. A typical fiber optic connector includes a ferrule which mounts and centers an optical fiber or fibers within the connector. The ferrule may be fabricated of such material as ceramic. A ferrule holder or other housing component of the connector embraces the ferrule and may be fabricated of such material as molded plastic. A spring may be disposed within the housing or ferrule holder such that the ferrule is yieldably biased forwardly for engaging another fiber-mounting ferrule of a mating connecting device.

A pair of fiber optic connectors or a connector and another optical fiber transmission device often are mated in an adapter which centers the fibers to provide low insertion losses. The adapter couples the connectors together so that their encapsulated fibers connect end-to-end. The adapter may be an in-line component, or the adapter can be designed for mounting in an opening in a panel, backplane, circuit board or the like.

Various problems are encountered when terminating optical fibers in fiber optic connectors versus terminating electrical conductors in electrical connectors, when situations arise wherein a fiber end of an "active" fiber optic connector is exposed. A typical situation might arise when one of the fiber optic connectors at one end of an adapter is removed, leaving the other "active" fiber optic connector in the adapter.

In particular, an exposed fiber end may be damaged by adverse environmental hazards, and the accumulation of dust and dirt may impair the optical transmission capabilities of the fiber. Another very important problem is to protect an operator's eyes from dangerous light beams from the exposed end of an active optical fiber. For instance, an operator's eyes may be damaged from dangerous light beams exiting an unprotected receptacle or adapter.

Heretofore, dust covers, end caps or spring-loaded shutters have been used to close an open end of a connector to, thereby, cover the exposed fiber ends to protect the fiber ends from adverse environmental hazards, dust or dirt and to prevent light energy from the fiber ends from exiting the connector.

Another problem with fiber optic connectors involves feeding the connector and its terminated optical fiber cable through various structures such as subfloors, walls, ducts, vents or the like. It would be undesirable to provide a pulling portion, such as a pulling eye, directly on the connector itself, because this would increase the size of the connector. Therefore, various housings have been proposed to encapsulate the connector, with the housing having a pulling portion or pulling eye to facilitate pulling the connector and terminated cable through an appropriate structure. These pulling housings increase installation expenses of fiber optic connectors, increase inventory and otherwise are often undesirable.

The present invention solves these diverse problems by providing a unique dust cover for a fiber optic connector, wherein the dust cover performs an additional function of providing a pulling device for the connector.

SUMMARY OF THE INVENTION

An object, therefore, of the invention is to provide a fiber optic connector assembly with a new and improved dust cover which performs a dual function of protecting the mating end of a fiber optic connector as well as providing a pulling device for the connector.

In the exemplary embodiment of the invention, the fiber optic connector assembly includes a fiber optic connector for termination to an optical fiber cable and including a mating end. A dust cover is securable to the fiber optic connector for protecting at least a portion of the mating end thereof. The dust cover includes a pulling portion for attachment thereto of a pulling device to facilitate pulling the connector and terminated optical fiber cable through an appropriate structure.

As disclosed herein, the pulling portion of the dust cover comprises a pulling eye. The dust cover includes the pulling eye at one end thereof and a mating face at an opposite end thereof for mating with the mating end of the fiber optic connector.

Other features of the invention include the dust cover having at least one hole for receiving a guide pin projecting from the mating end of the fiber optic connector. The dust cover includes a receptacle for receiving a plug portion at the mating end of the fiber optic connector. The dust cover further includes a recess in a base of the receptacle for accommodating an end of a ferrule at the mating end of the fiber optic connector.

In the preferred embodiment of the invention, the dust cover is secured to the mating end of the fiber optic connector by taking advantage of the securing means of the connector itself. Specifically, the dust cover includes an internally threaded hole for receiving a jack screw of the fiber optic connector to secure the dust cover to the connector. The cover simply is removed by unscrewing the jack screw which remains with the connector.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
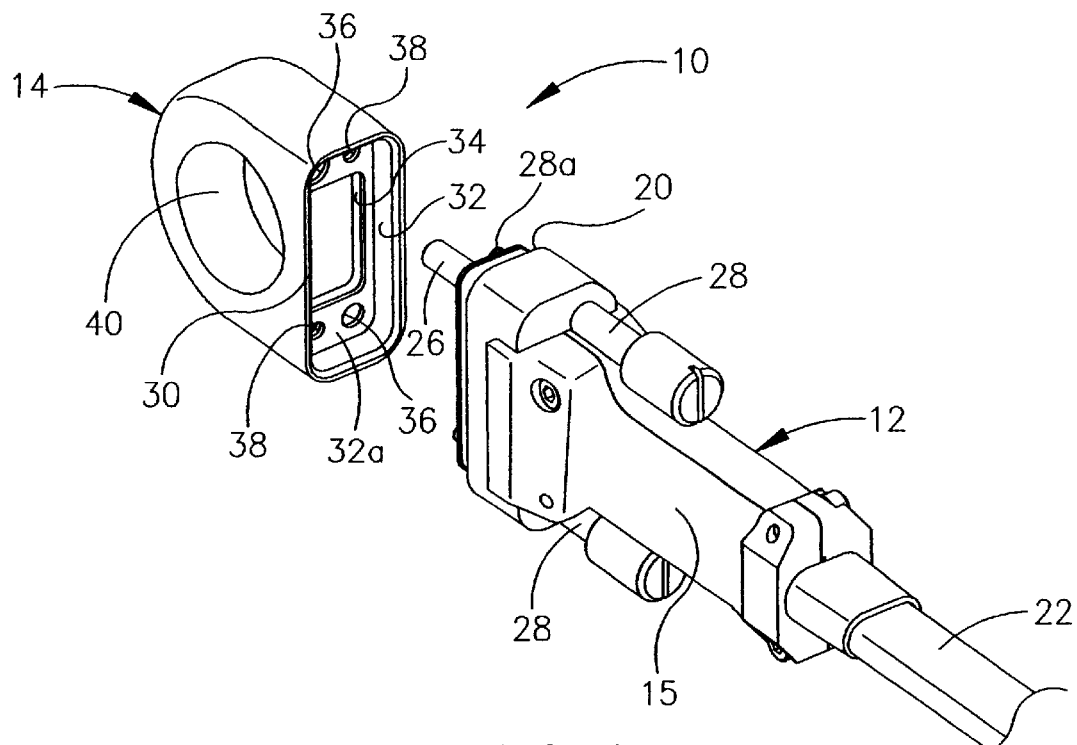
FIG. 1 is a perspective view of a fiber optic connector assembly including a fiber optic connector and a dust cover according to the invention.
Figure 2:
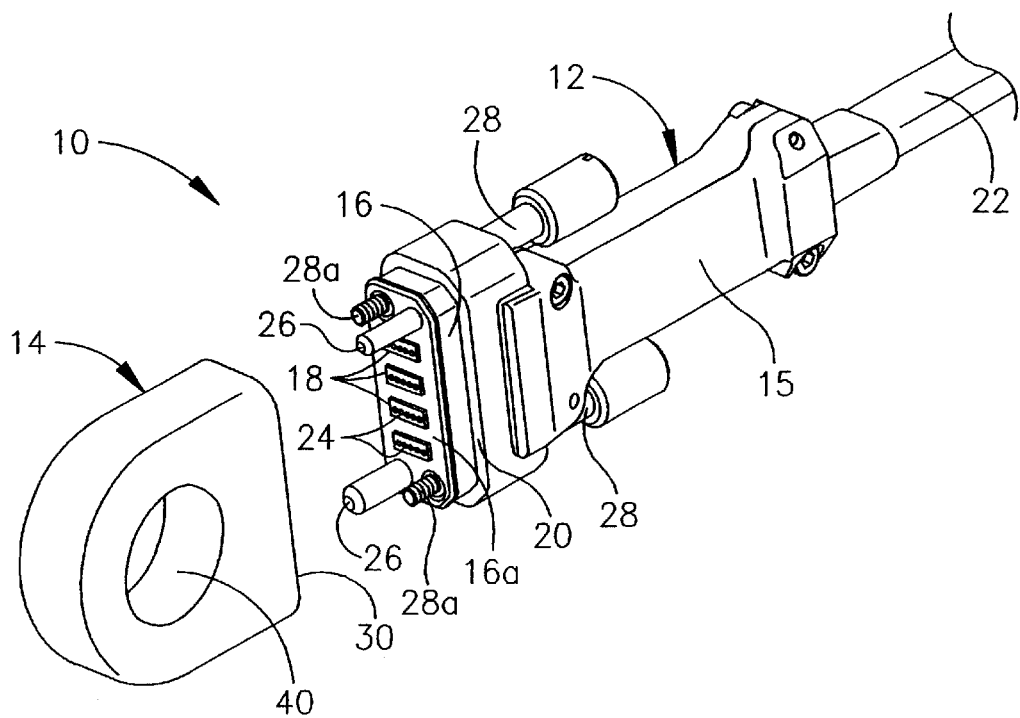
FIG. 2 is a perspective view of the fiber optic connector assembly, looking in a direction opposite that of FIG. 1.

Referring to the drawings in greater detail, and first to FIGS. 1 and 2, the invention is embodied in a fiber optic connector assembly, generally designated 10. The assembly includes a fiber optic connector, generally designated 12, and a dual-function dust cover, generally designated 14, which is securable to the connector.

Still referring to FIGS. 1 and 2, fiber optic connector 12 includes a multi-part housing 15 surrounding a ferrule holder 16 (FIG. 2) which mounts a plurality of ferrules 18 which project slightly beyond a front face 16a of holder 16. Actually, holder 16 forms a plug portion at a mating end 20 of the connector, the plug portion being surrounded by a step or shoulder 20. Connector 12 terminates an optical fiber cable 22 which includes a plurality of optical fibers 24 (FIG. 2) terminated in ferrules 18. A pair of alignment pins 26 project forwardly of mating end 20 of the connector for insertion into a pair of alignment holes in a complementary mating fiber optic connector or other connecting device, as is known in the art.

Finally, a pair of jack screws 28 extend through housing 15 in the mating direction of connector 12. As is known in the art, jack screws 28 include externally threaded ends 28a which project forwardly of mating end 20 of the connector for threading into appropriate internally threaded holes of the complementary mating device to which connector 12 is mated. The jack screws may be threaded into a wide variety of other structures to which connector 12 is secured.

Figure 3:
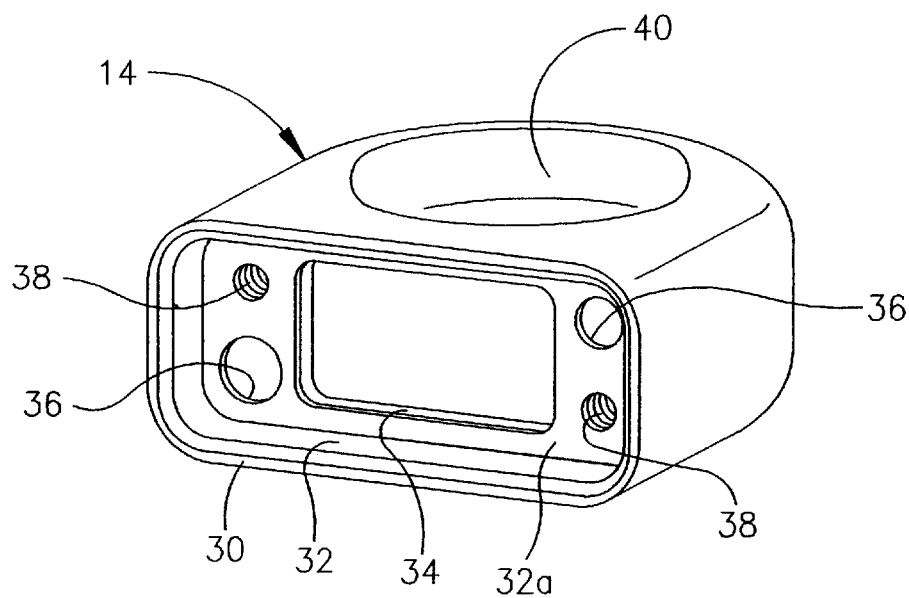
FIG. 3 is a perspective view of the mating face of the dust cover.

Referring to FIG. 3 in conjunction with FIGS. 1 and 2, dust cover 14 includes a mating face 30 for mating with mating end 20 of fiber optic connector 12. The dust cover may be a one-piece structure molded of such material as plastic or the like. Mating face 30 includes a receptacle 32 for receiving plug portion 16 at mating end 20 of the connector. A recess 34 is formed in a base 32a of the receptacle for accommodating the ends of ferrules 18 and to prevent the ferrules and the ends of optical fibers 24 from abutting against any extraneous surfaces. A pair of holes 36 are formed in the base of receptacle 32 for receiving alignment pins 26 projecting from the connector. A pair of internally threaded holes 38 are provided in the base of receptacle 32 for receiving externally threaded ends 28a of jack screws 28. Therefore, dust cover 14 is secured to mating end 20 of the connector as seen in FIG. 4 by rotating jack screws 28 to tighten ends 28a thereof within internally threaded holes 38 of the dust cover to draw mating face 30 of the dust cover into secure engagement with mating end 20 of the connector.

Figure 4:
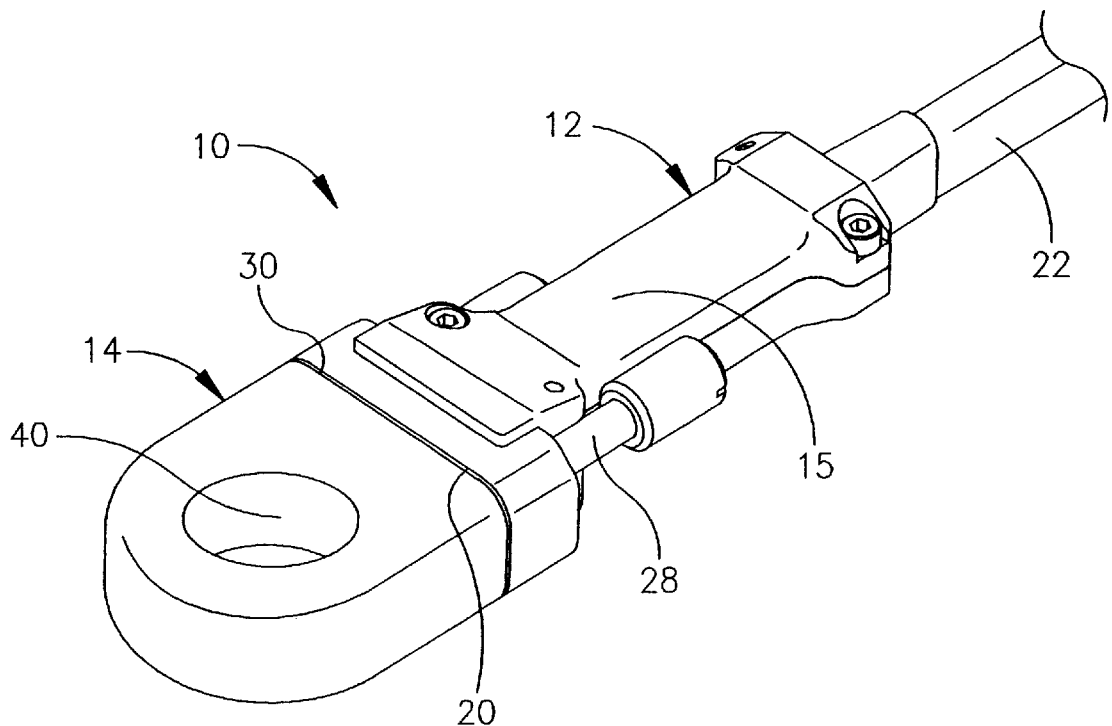
FIG. 4 is a perspective view of the assembly, with the dust cover secured to the connector.

When dust cover 14 is secured to the mating end of connector 12 as seen in FIG. 4, the dust cover protects the exposed ends of optical fibers 22 from damage by adverse environmental hazards as well as the accumulation of dust and dirt which may impair the optical transmission capabilities of the fibers. In addition, an operator's eyes are protected from dangerous light beams from the exposed ends of the optical fibers should the fibers be "active".

Dust cover 14 is a unique structure in that it performs a dual function of both protecting mating end 20 of connector 12 and the ends of optical fibers 24, as well as providing a pulling device to facilitate pulling the connector and terminated optical fiber cable 22 through an appropriate structure. Specifically, dust cover 14 includes a pulling portion in the form of a pulling eye 40. An appropriate pulling device, such as a pulling line or cable can be attached to dust cover 14 through pulling eye 40 and the entire fiber optic connector assembly 10 can be easily pulled or fed through various structures, as necessary. Therefore, dust cover 14 completely eliminates the need for any other extraneous pulling apparatus which might be attached to or encompass connector 12.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A fiber optic connector assembly, comprising:

a fiber optic connector for termination to an optical fiber cable and including a mating end, a plug portion at the mating end, a fiber-terminating ferrule exposed at the plug portion, an alignment pin projecting from the mating end and a jack screw adjacent the mating end;

a dust cover including a mating face and a receptacle for receiving the plug portion at the mating end of the fiber optic connector, a recess in a base of the receptacle for accommodating said ferrule, a hole for receiving said alignment pin and an internally threaded hole for receiving said jack screw to secure the dust cover to the connector; and said dust cover including a pulling portion for attachment thereto of a pulling device to facilitate pulling the connector and terminated optical fiber cable through an appropriate structure.

2. The fiber optic connector assembly of claim 1 wherein said pulling portion of the dust cover comprises a pulling eye.

3. The fiber optic connector assembly of claim 2 wherein said pulling eye is at an end of the dust cover opposite said mating face.

4. A dual-function dust cover for a fiber optic connector having a mating end, comprising:

a securing portion for facilitating securing the dust cover to the fiber optic connector to protect at least a portion of the mating end thereof; and a pulling portion for attachment thereto of a pulling device to facilitate pulling the connector through an appropriate structure, wherein said dust cover includes an internally threaded hole for receiving a jack screw of the fiber optic connector to secure the dust cover to the connector.

5. The dual-function dust cover of claim 4 wherein said pulling portion of the dust cover comprises a pulling eye.

6. The dual-function dust cover of claim 5 wherein said dust cover includes said pulling eye at one end thereof and a mating face at an opposite end thereof for mating with the mating end of the fiber optic connector.

7. The dual-function dust cover of claim 4 wherein said dust cover includes at least one hole for receiving an alignment pin projecting from the mating end of the fiber optic connector.

8. The dual-function dust cover of claim 4 wherein said dust cover includes a recess for accommodating an end of a ferrule at the mating end of the fiber optic connector.

9. The dual-function dust cover of claim 4 wherein said dust cover includes a receptacle for receiving a plug portion at the mating end of the fiber optic connector.

10. The dual-function dust cover of claim 9 wherein said dust cover includes a recess in a base of said receptacle for accommodating an end of a ferrule at the mating end of the fiber optic connector.

* * * * *